(12) United States Patent
Jeong et al.

(10) Patent No.: US 12,689,101 B2
(45) Date of Patent: Jul. 21, 2026

(54) SECONDARY BATTERY AND MANUFACTURING METHOD THEREOF

(71) Applicant: Samsung SDI Co., Ltd., Yongin-si (KR)

(72) Inventors: Eui Kwang Jeong, Yongin-si (KR); Jeong Wook Yi, Yongin-si (KR); Hyun Ki Jung, Yongin-si (KR); Seong Bong Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 772 days.

(21) Appl. No.: 17/811,844

(22) Filed: Jul. 11, 2022

(65) Prior Publication Data

US 2023/0020769 A1    Jan. 19, 2023

(30) Foreign Application Priority Data

Jul. 14, 2021    (KR) ........................ 10-2021-0092163

(51) Int. Cl.
| | |
|---|---|
| *H01M 50/559* | (2021.01) |
| *H01M 50/271* | (2021.01) |
| *H01M 50/538* | (2021.01) |
| *H01M 50/552* | (2021.01) |
| *H01M 50/566* | (2021.01) |

(52) U.S. Cl.
CPC ....... *H01M 50/559* (2021.01); *H01M 50/271* (2021.01); *H01M 50/538* (2021.01); *H01M 50/561* (2021.01); *H01M 50/566* (2021.01)

(58) Field of Classification Search
CPC ............. H01M 50/533; H01M 50/538; H01M 50/552; H01M 50/559; H01M 50/561
See application file for complete search history.

(56) References Cited

U.S. PATENT DOCUMENTS

| | | | |
|---|---|---|---|
| 9,287,588 B2 | 3/2016 | Kusama et al. | |
| 10,601,014 B2 | 3/2020 | Okada et al. | |
| 10,826,029 B2 | 11/2020 | Ogawa et al. | |
| 2008/0057394 A1* | 3/2008 | Rigobert ............ | H01M 50/528 |
| | | | 29/623.2 |
| 2010/0003583 A1 | 1/2010 | Seong et al. | |
| 2012/0279053 A1 | 11/2012 | Kusama et al. | |

(Continued)

FOREIGN PATENT DOCUMENTS

| | | |
|---|---|---|
| CN | 201781028 U | 3/2011 |
| CN | 103178231 A | 6/2013 |

(Continued)

OTHER PUBLICATIONS

Extended European Search Report, Application No. 22184936.7, dated Dec. 23, 2022, 6 pps.

*Primary Examiner* — Kevin E Yoon
(74) *Attorney, Agent, or Firm* — Womble Bond Dickinson (US) LLP

(57) ABSTRACT

A secondary battery according to one or more embodiments of the present disclosure includes a case for accommodating an electrode assembly in an internal accommodating space, a cap plate, a first terminal inserted into the cap plate in a first direction, and bent at an inner surface of the cap plate to be coupled to the cap plate, and a collector plate in the case, electrically connected to a first electrode of the electrode assembly, and coupled to the first terminal in the first direction.

6 Claims, 6 Drawing Sheets

(56) References Cited

U.S. PATENT DOCUMENTS

| | | | |
|---|---|---|---|
| 2017/0365838 A1 | 12/2017 | Okada et al. | |
| 2018/0083302 A1 | 3/2018 | Koo et al. | |
| 2019/0044102 A1 | 2/2019 | Ogawa et al. | |
| 2020/0144585 A1 | 5/2020 | Zeng et al. | |
| 2022/0255202 A1 * | 8/2022 | Sakurai | H01M 50/566 |

FOREIGN PATENT DOCUMENTS

| | | | | |
|---|---|---|---|---|
| CN | 107251270 A | 10/2017 | | |
| CN | 108028328 A | 5/2018 | | |
| CN | 109119674 A | 1/2019 | | |
| CN | 109904379 A | 6/2019 | | |
| CN | 209133626 U | 7/2019 | | |
| CN | 209183656 U | 7/2019 | | |
| CN | 209200018 U | 8/2019 | | |
| CN | 112909445 A | 6/2021 | | |
| DE | 102012204595 A1 * | 9/2013 | .......... | H01M 50/562 |
| EP | 0878855 A1 * | 11/1998 | .......... | H01M 10/286 |
| JP | 2008-066302 A | 3/2008 | | |
| JP | 5650704 B2 | 1/2015 | | |
| JP | 2018139191 A | 9/2018 | | |
| JP | 4356314 B2 | 11/2019 | | |
| JP | 2020-140863 A | 9/2020 | | |
| JP | 3229347 U | 12/2020 | | |
| KR | 10-1023865 A | 3/2011 | | |
| KR | 10-1257633 B1 | 4/2013 | | |

* cited by examiner

SECONDARY BATTERY AND MANUFACTURING METHOD THEREOF

CROSS-REFERENCE TO RELATED APPLICATION

This application claims priority to, and the benefit of, Korean Patent Application No. 10-2021-0092163 filed on Jul. 14, 2021 in the Korean Intellectual Property Office, the contents of which in its entirety are herein incorporated by reference.

BACKGROUND

1. Field

The present disclosure relates to a secondary battery and to a manufacturing method thereof, which may improve welding quality of an electrode terminal, may reduce foreign materials due to welding, may reduce costs, and may improve an assembling process.

2. Description of the Related Art

In general, a secondary battery is manufactured by accommodating an electrode assembly including a cathode plate, an anode plate, and a separator interposed between the two plates with an electrolyte in a case. The secondary battery can be charged and discharged, unlike a primary battery, which is not rechargeable. As technologies for mobile devices, such as mobile phones, notebook computers, or the like are developed, and as production of the mobile devices increases, a demand for secondary batteries as energy sources is sharply increased. Recently, secondary batteries have been actively developed as alternative energy sources of fossil fuels for use in electric vehicles, hybrid vehicles, etc.

Currently commercially available secondary batteries include a nickel-cadmium battery, a nickel-hydrogen battery, a nickel-zinc battery, a lithium secondary battery, and so on. For example, the lithium secondary battery generates little memory effect, compared to a nickel-based secondary battery, making the lithium secondary battery capable of being freely charged and discharged. The lithium secondary battery has several advantages, including a low self-discharge rate and a high-energy density. Accordingly, the lithium secondary battery is drawing increasing attention.

SUMMARY

The present disclosure provides a secondary battery and a manufacturing method thereof, which may improve welding quality of an electrode terminal, may reduce foreign materials due to welding, may reduce costs, and may improve an assembling process.

A secondary battery according to one or more embodiments of the present disclosure may include a case for accommodating an electrode assembly in an internal accommodating space, a cap plate, a first terminal inserted into the cap plate in a first direction, and bent at an inner surface of the cap plate to be coupled to the cap plate, and a collector plate in the case, electrically connected to a first electrode of the electrode assembly, and coupled to the first terminal in the first direction.

The secondary battery may further include an insulation plate between the first terminal and the cap plate.

An end of the insulation plate may be bent with the first terminal.

The first terminal and/or the collector plate may define a hollow therein corresponding to a region for welding.

The cap plate may be integrally formed with the case, and may constitute one surface of the case.

Additionally, a method of manufacturing a secondary battery, according to one or more embodiments of the present disclosure may include inserting a first terminal into a hole of a cap plate in a first direction, fixing an end of the first terminal to the cap plate by clinching the end of the first terminal from an inner surface of the cap plate, bringing a collector plate into contact with an inner surface of the first terminal, and welding the collector plate to the first terminal by irradiating welding beams from outside of the first terminal.

The method may further include providing an insulation plate between the first terminal and the cap plate.

The method may further include clinching an end of the insulation plate and an end of the first terminal.

The method may further include irradiating the welding beams to an area corresponding to a hollow defined in the first terminal and/or the collector plate.

The cap plate may be integrally formed with a case of the secondary battery, and constitutes one surface of the case.

DETAILED DESCRIPTION

Figure 1:
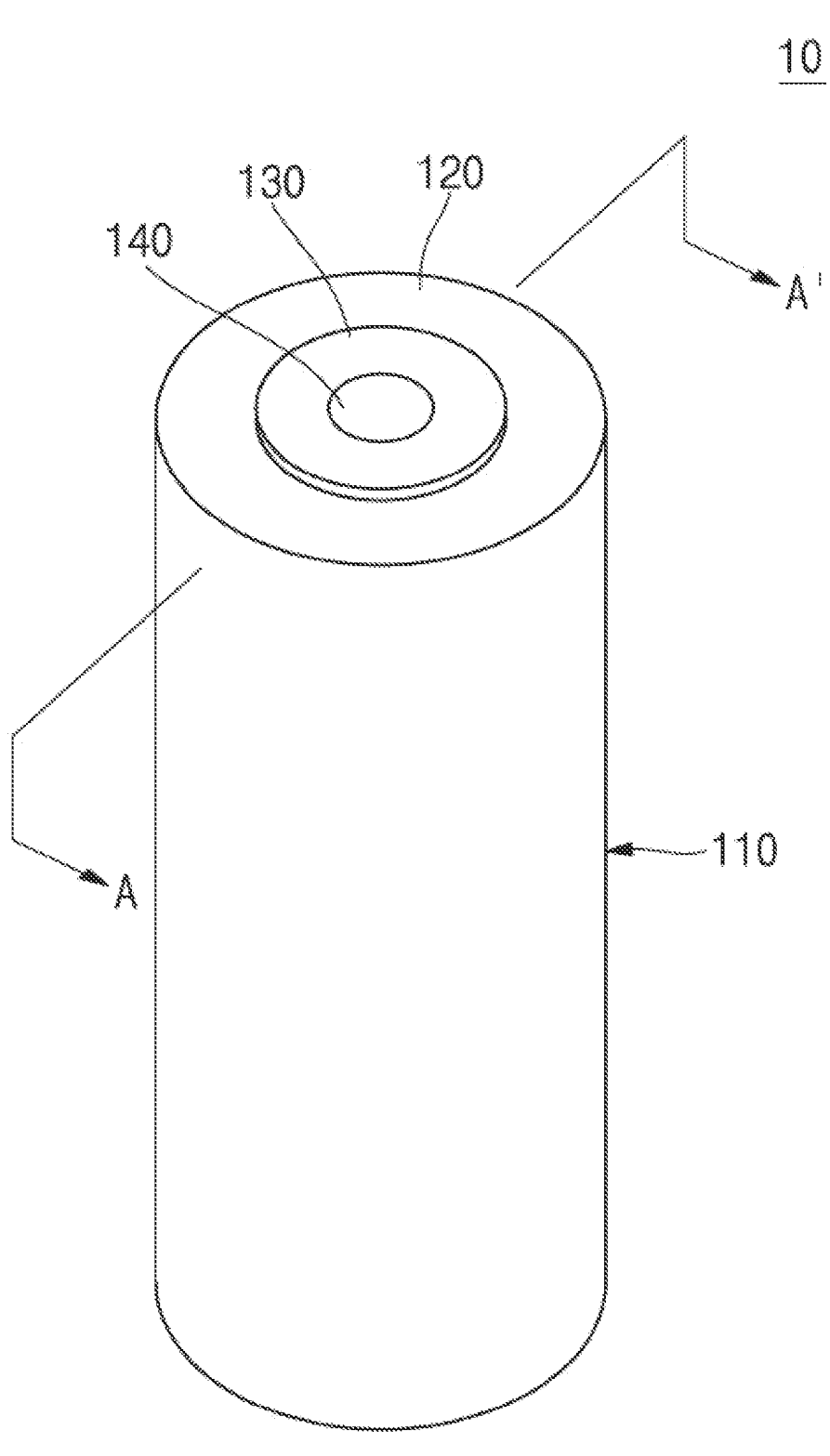
FIG. 1 is a perspective view of a secondary battery according to one or more embodiments of the present disclosure.

Hereinafter, one or more embodiments of the present disclosure will be described in detail with reference to the accompanying drawings.

Embodiments of the present disclosure are provided to more completely explain the present disclosure to those skilled in the art, and the following examples may be modified in various other forms. The present disclosure, however, may be embodied in many different forms and should not be construed as being limited to the example (or exemplary) embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the term "below" can encompass both an orientation of above and below.

FIG. 1 is a perspective view of a secondary battery according to one or more embodiments of the present disclosure.

First, referring to FIG. 1, a secondary battery 10 according to one or more embodiments of the present disclosure includes a case 110, a cap plate 120 formed on, or forming (e.g., constituting), one surface of the case 110, an insulation plate 130 formed on a region of the cap plate 120, and a first terminal 140 formed inside the insulation plate 130 and having a first polarity.

Here, the case 110 may accommodate the electrode assembly and an electrolyte included in the secondary battery 10 (e.g., in an internal accommodating space), according to one or more embodiments of the present disclosure. To this end, the case 110 may be manufactured by a process, such as deep drawing, and may be provided in a cylindrical shape having a hollow space (e.g., an internal accommodating space), for example. The case 110 may be formed of a metal, such as aluminum or iron, and may be electrically connected to a second polarity of the electrode assembly, and as will be described later, the cap plate 120 coupled to the case 110 may serve as a second terminal.

In the case of the cap plate 120, although shown as a separate component from the case 110, the cap plate 120 may refer to a first surface that is a part of the case 110. When the cap plate 120 is configured separately from the case 110, the cap plate 120 may be coupled by welding along a boundary in contact with the case 110. Meanwhile, when the cap plate 120 corresponds to the first surface of the case 110, the cap plate 120 may be formed through an integral structure together with the case 110 during the manufacturing process of the case 110.

In addition, the cap plate 120 may have the same polarity as the case 110, and may form a second polarity (e.g., may serve as a negative electrode), like the case 110. In addition, because the cap plate 120 may be formed on the same surface as the first terminal, the cap plate 120 may serve as a second terminal. However, the first polarity and the second polarity may be changed according to the selection by a person skilled in the art.

Meanwhile, the cap plate 120 may have a circular shape on the basis of a cylindrical battery, and may have a hole formed approximately in the center thereof, and thus the insulation plate 130 and the first terminal 140 may be coupled thereto. In addition, although the first terminal 140 has a first polarity, the insulation plate 130 is formed between the first terminal 140 and the cap plate 120, and thus can be electrically isolated from the cap plate 120.

The insulation plate 130 may include a gasket having an approximately "L" shape, and an insulating member integrally formed with or separately formed from the gasket may further extend along the surface of the cap plate 120 from the gasket, thereby reducing or preventing the likelihood of the cap plate 120 and the first terminal 140 contacting each other. In addition, due to the L-shaped gasket of the insulation plate 130, it is not necessary to separately form an insulating member on the insulation plate 130, thereby reducing the total number of parts and saving the cost. The insulation plate 130 may be made of a material, such as polypropylene (PP) or polyethylene (PE), which may be a common material, but the content of the present disclosure is not limited thereto.

The first terminal 140 may be formed in the center of the insulation plate 130 while having a smaller area than the insulation plate 130. The first terminal 140 may be electrically connected to the first electrode of the electrode assembly, which will be described later, and to this end, the first electrode and the collector plate of the electrode assembly may be coupled to the lower portion thereof. The coupling structure and manufacturing method of the first terminal 140 will be described later.

Hereinafter, a manufacturing process of a secondary battery according to one or more embodiments of the present disclosure will be sequentially described.

Figure 2:
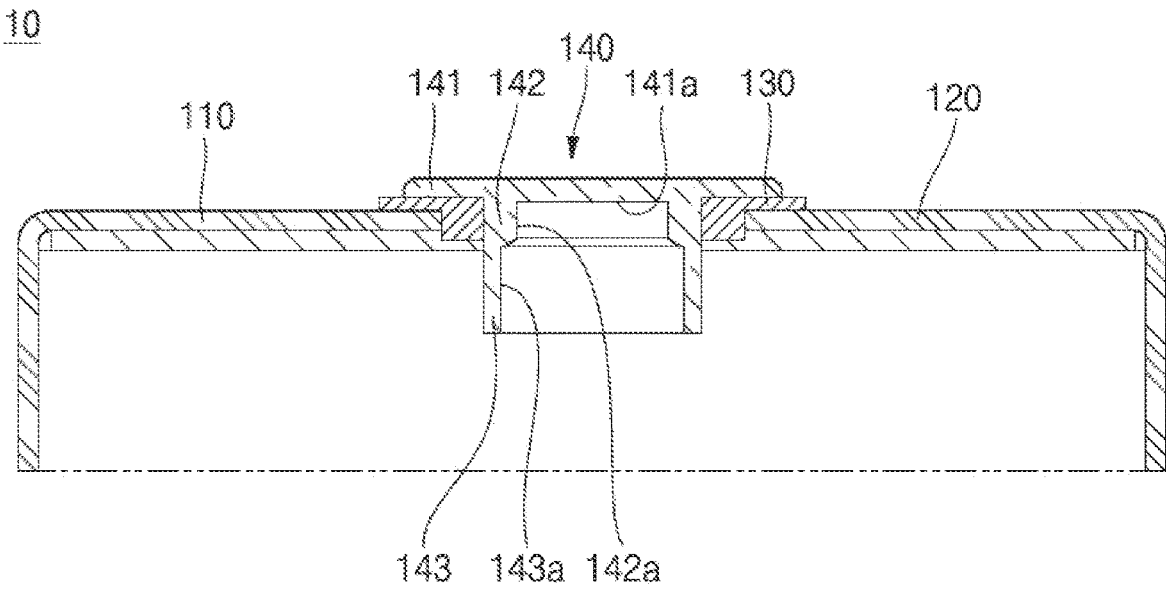
FIG. 2 is a partial cross-sectional view taken along the line A-A' of FIG. 1, illustrating a state in which a first terminal is inserted in a secondary battery according to one or more embodiments of the present disclosure.
Figure 3:
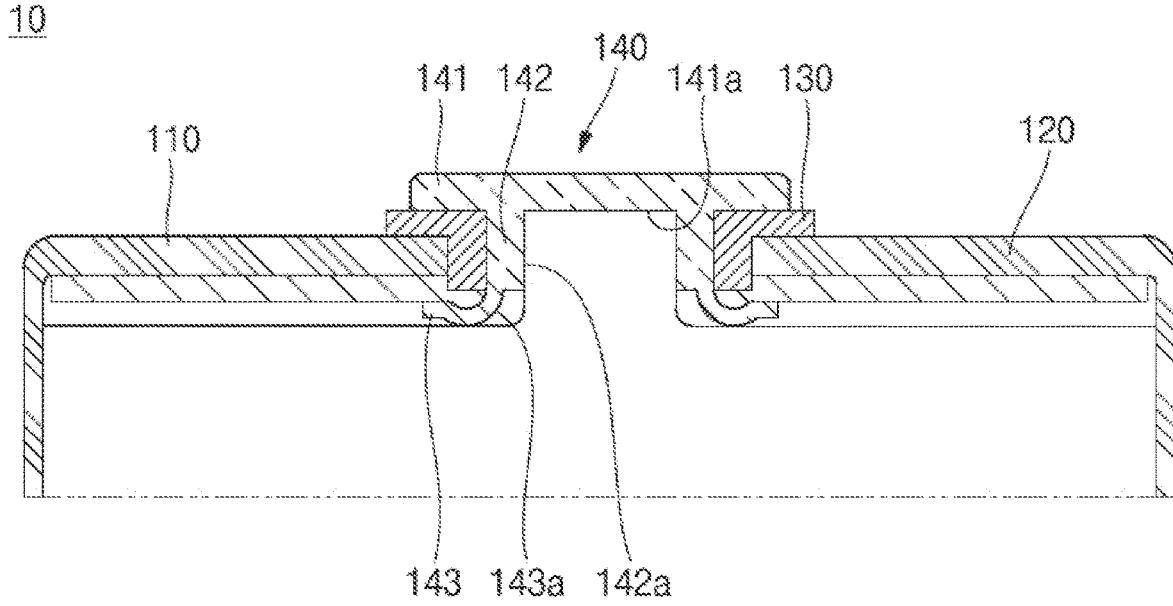
FIG. 3 is a partial cross-sectional view illustrating a process in which clinching is performed on a first terminal in a secondary battery according to one or more embodiments of the present disclosure.
Figure 4A:
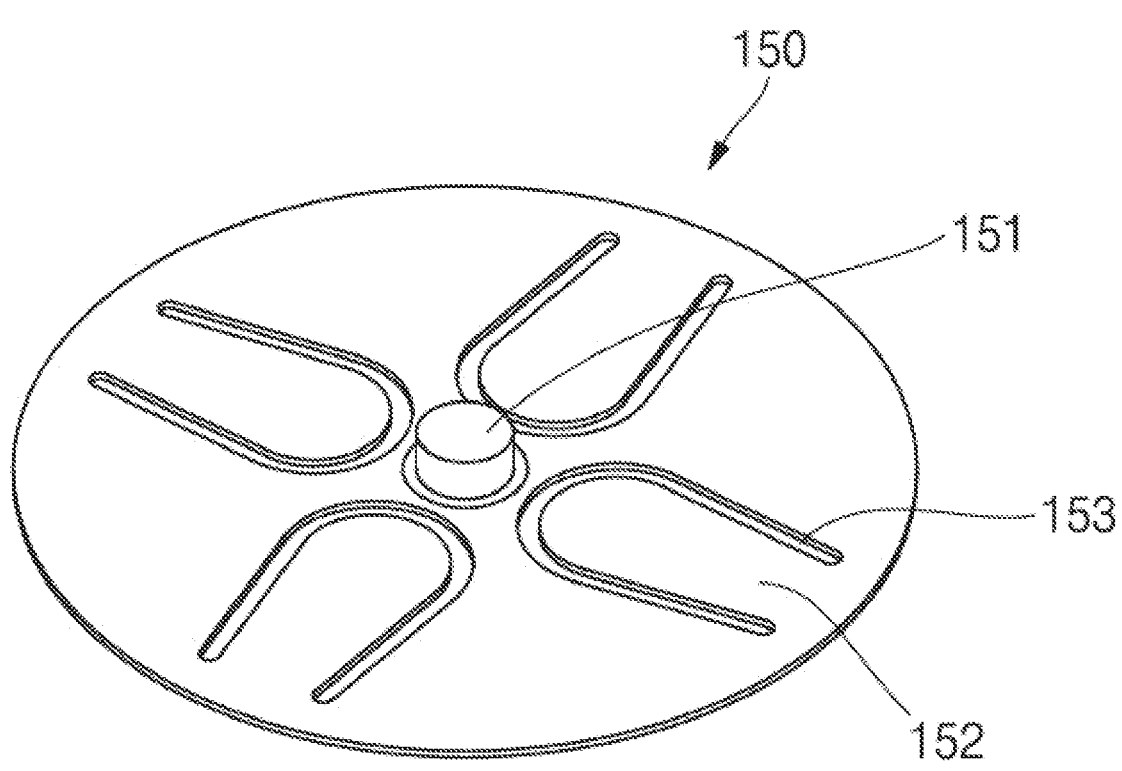
FIG. 4A is a perspective view illustrating a collector plate used in a secondary battery according to one or more embodiments of the present disclosure.
Figure 4B:
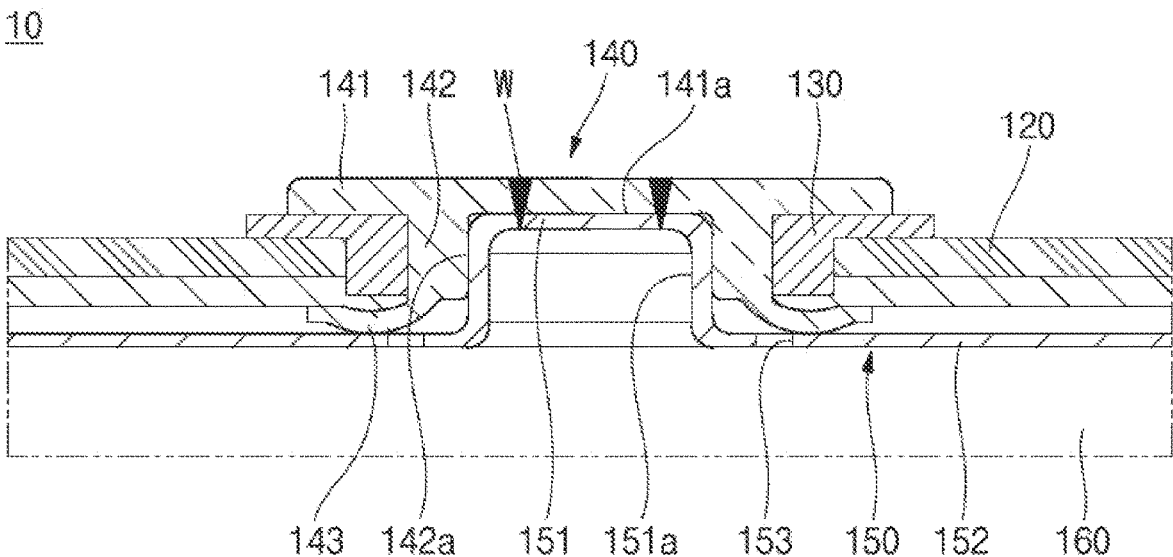
FIG. 4B is a partial cross-sectional view illustrating a process in which a collector plate is coupled to a first terminal in a secondary battery according to one or more embodiments of the present disclosure.

FIG. 2 is a partial cross-sectional view taken along the line A-A' of FIG. 1, illustrating a state in which a first terminal is inserted in a secondary battery according to one or more embodiments of the present disclosure. FIG. 3 is a partial cross-sectional view illustrating a process in which clinching (e.g., bending or crimping) is performed on a first terminal in a secondary battery according to one or more embodiments of the present disclosure. FIG. 4A is a perspective view illustrating a collector plate used in a secondary battery according to one or more embodiments of the present disclosure. FIG. 4B is a partial cross-sectional view illustrating a process in which a collector plate is coupled to a first terminal in a secondary battery according to one or more embodiments of the present disclosure.

First, referring to FIG. 2, to manufacture the secondary battery 10 according to one or more embodiments of the present disclosure, the insulation plate 130 and the first terminal 140 may first be inserted into the cap plate 120.

Here, the insulation plate 130 may be coupled to, while enclosing an edge with respect to the lower surface of, the first terminal 140. In addition, the insulation plate 130 may have a larger area than the first terminal 140 in the horizontal direction.

The first terminal 140 may include a terminal portion 141 flatly formed on the upper surface thereof, a coupling portion 142 formed under the terminal portion 141 and defining a first hollow (e.g., a first cavity) 142a therein, and a deformed portion 143 defining a second hollow (e.g., a second cavity) 143a having a larger diameter than that of the first hollow 142a, and extending to the lower portion of the coupling portion 142. In addition, a lower surface (e.g., an inner surface) 141a of the terminal portion 141 may be exposed inside the first hollow 142a.

Meanwhile, the coupling portion 142 and the deformed portion 143 of the first terminal 140 may be initially formed to be approximately perpendicular to the surface of the terminal portion 141, and may maintain a state in which the insulation plate 130 is coupled along the outer edge of the coupling portion 142. In addition, as described above, in a state in which the coupling portion 142 is coupled to the insulation plate 130, the coupling portion 142 may be coupled to the inside of the hole of the cap plate 120 in the vertical direction. Here, the insulation plate 130 may be inserted into the hole of the cap plate 120 in an interference-fit manner, thereby sealing the cap plate 120.

Next, referring to FIG. 3, a clinching process, or crimping process, may be performed from the lower portion of the deformed portion 143 of the first terminal 140, and thus the deformed portion 143 may be deformed (e.g., bent). The clinching process may allow stable coupling between components without an additional structure or heating. The clinching process may change the shape of the deformed portion 143 by pressing the lower portion of the deformed portion 143 by means of a punch, and may be advantageous in that riveting is enabled without rivets. In addition, through the clinching process, the first terminal 140 can be formed by unifying a rivet plate and a rivet applied to existing riveting processes, thereby reducing the number of parts and reducing production cost. In addition, compared to riveting, the clinching process is simple in terms of component configuration and process, thereby improving the assembling process.

For example, pressure is applied from the lower portion of the deformed portion 143 through the clinching process, and the deformed portion 143 may be deformed to be opened (e.g., bent to be spread out) at the lower portion thereof, which is closely coupled to the lower surface of the insulation plate 130. In addition, even in this case, the coupling portion 142 may remained undeformed, so that the first hollow 142a may be maintained, and the lower surface 141a of the terminal portion 141 therein may also still be exposed.

Next, referring to FIGS. 4A and 4B, the collector plate 150 may be coupled to the first terminal 140 from the lower portion thereof.

The collector plate 150 may include a protrusion 151 facing upwards at an approximate center thereof, and may include a plurality of variable coupling portions 152 that may be symmetrically formed around the protrusion 151. Here, the protrusion 151 may have a hollow cylindrical shape defining a third hollow 151a, and may be coupled to the inside of the first hollow 142a provided in the coupling portion 142 of the first terminal 140. For example, the upper surface of the protrusion 151 may contact the lower surface 141a of the terminal portion 141 exposed through the first hollow 142a. In addition, in this state, welding is performed from the upper portion of the terminal portion 141 through welding beams W, thereby stably coupling the terminal portion 141 of the first terminal 140 and the protrusion 151 of the collector plate 150.

In addition, as shown in FIG. 4B, as long as the welding beams W pass through the terminal portion 141, which is relatively thin, and the protrusion 151, then welding between the terminal portion 141 and the protrusion 151 can be successfully performed. That is, through the first hollow 142a formed in the coupling portion 142 of the first terminal 140 and the hollow formed in the protrusion 151 of the collector plate 150, each of the coupling portion 142 and the protrusion 151 may have a relatively small thickness, as compared to the overall thickness of the first terminal 140 or the collector plate 150. Accordingly, because the welding beams W are irradiated while the coupling portion 142 and the protrusion 151 are in contact with each other, the transmission thickness of the welding beams W is reduced, thereby performing welding even with low-power welding beams and improving welding quality. In addition, because the welding beams W are applied from the outside of the first terminal 140 while the protrusion 151 of the collector plate 150 is inserted into the coupling portion 142, the possibility of generating internal metal foreign materials may be reduced, thereby improving welding quality and improving battery stability as well.

Meanwhile, the variable coupling portions 152 of the collector plate 150 may consist of a plurality of pieces cut through a cut-out hole 153. The variable coupling portions 152 may be coupled to the first electrode of the electrode assembly by welding, but may be flexibly deformed with respect to the flow of the electrode assembly through the cut-out hole 153. Accordingly, even if a flow (e.g., of electrolyte) occurs after welding of the electrode assembly, the flow may be absorbed through the variable coupling portions 152, thereby stably maintaining the coupling of the electrode assembly.

Then, in one or more embodiments, the second electrode of the electrode assembly may be coupled to the second collector plate, etc. In addition, the second collector plate may be electrically connected to the case 110, or may be exposed to the outside through a separate second terminal insulated from the case 110, according to the selection by a person skilled in the art. Therefore, the secondary battery 10 according to one or more embodiments of the present disclosure has the first terminal 140 and the case 110, which are configured to be electrically insulated through the insulation plate 130, and as described above, the reliability of the battery 10 may be increased by improving the welding quality of the first terminal 140.

Hereinafter, a method of manufacturing a secondary battery according to one or more other embodiments of the present disclosure will be described.

Figure 5:
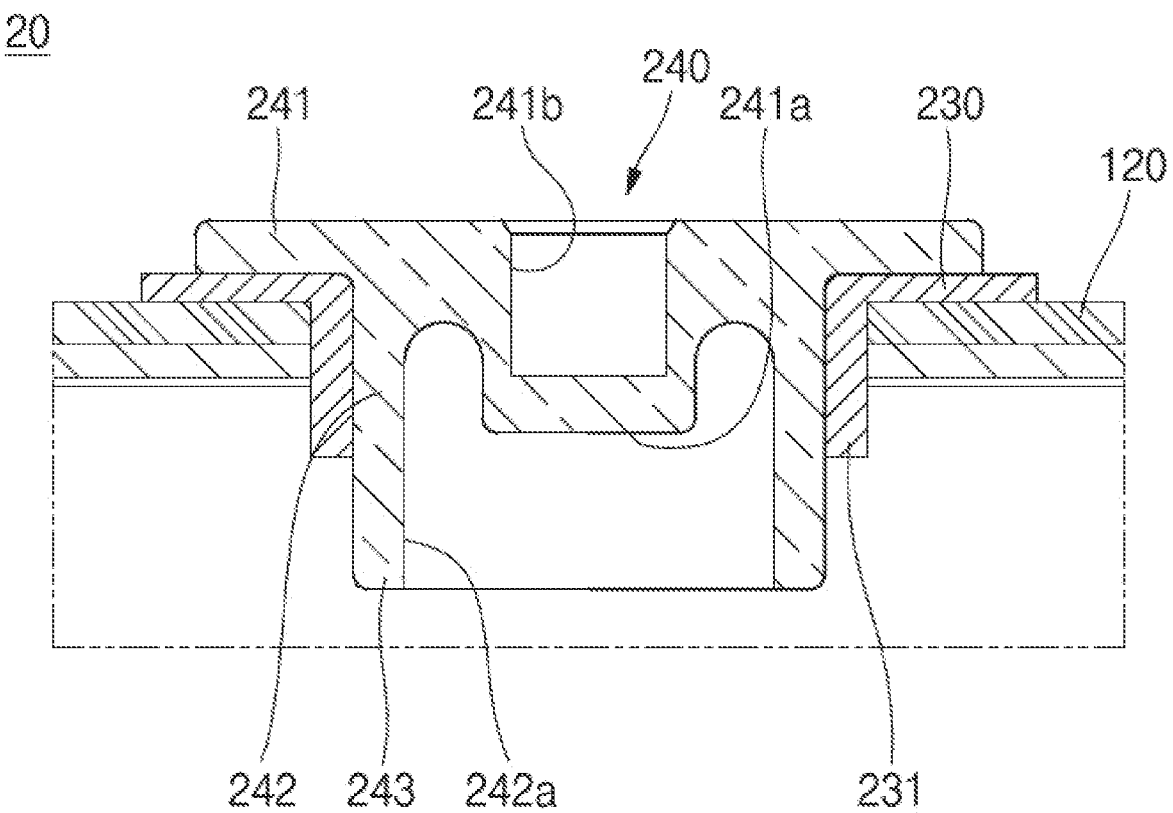
FIG. 5 is a partial cross-sectional view illustrating a state in which a first terminal is inserted in a secondary battery according to one or more other embodiments of the present disclosure.
Figure 6:
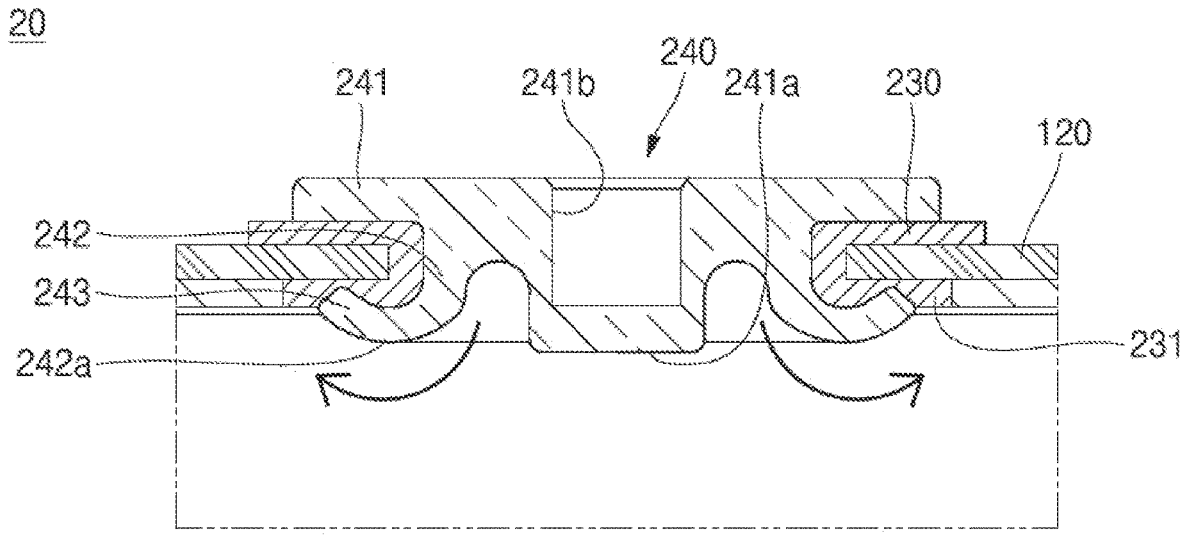
FIG. 6 is a partial cross-sectional view illustrating a process in which clinching is performed on a first terminal in a secondary battery according to one or more other embodiments of the present disclosure.
Figure 7:
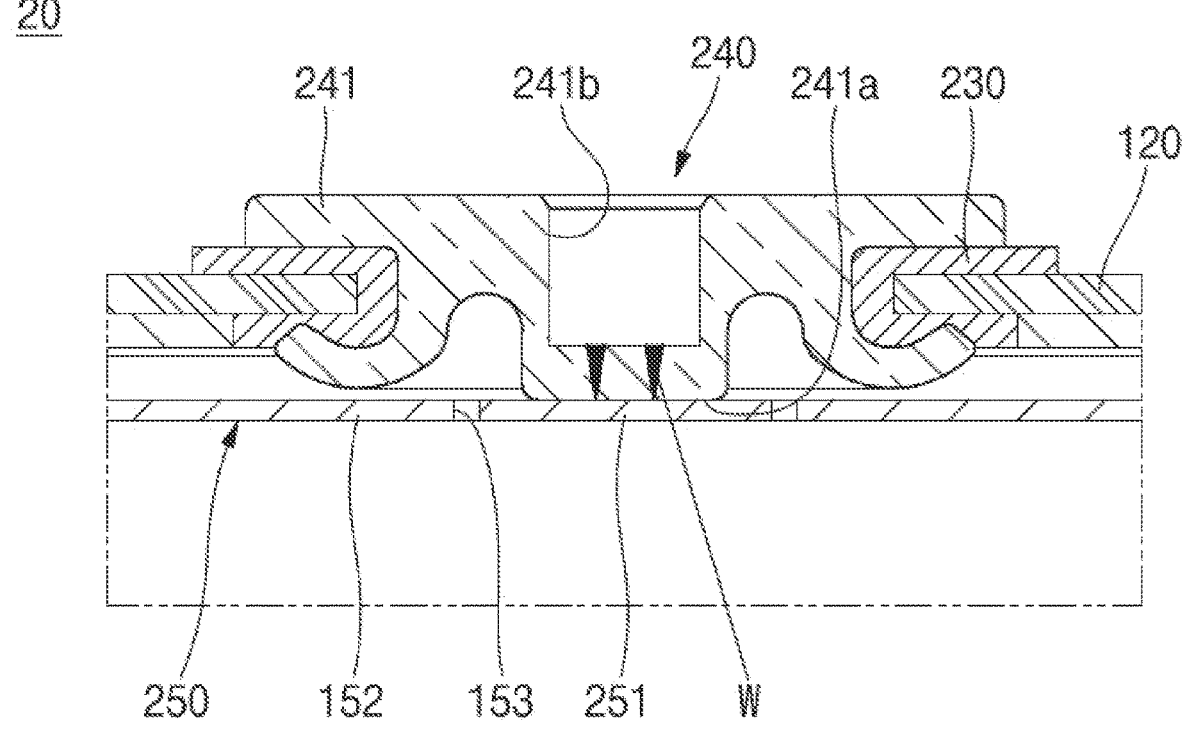
FIG. 7 is a partial cross-sectional view illustrating a process in which a collector plate is coupled to a first terminal in a secondary battery according to one or more other embodiments of the present disclosure.

FIG. 5 is a partial cross-sectional view illustrating a state in which a first terminal is inserted in a secondary battery according to one or more other embodiments of the present disclosure. FIG. 6 is a partial cross-sectional view illustrating a process in which clinching is performed on a first terminal in a secondary battery according to one or more other embodiments of the present disclosure. FIG. 7 is a partial cross-sectional view illustrating a process in which a collector plate is coupled to a first terminal in a secondary battery according to one or more other embodiments of the present disclosure.

Components having the same configuration and operation as those of the above-described embodiments are given the same reference numerals, and the following description will focus on differences from one or more previously described embodiments.

First, referring to FIG. 5, a secondary battery 20 according to one or more other embodiments of the present disclosure includes a case 110, a cap plate 120 formed on one surface of the case 110, an insulation plate 230 formed on a partial region of the cap plate 120, and a first terminal 240 formed inside the insulation plate 230 and having a first polarity.

The insulation plate 230 is configured similarly to the insulation plate 130 of one or more previously described embodiments, but has a configuration in which the inner end 231 extends downwardly further. According to this configuration, when the clinching process for the first terminal 240 is performed in a subsequent process, an inner end 231 of the insulation plate 230 may also be deformed (e.g., bent) together with the first terminal 240. In addition, because the inner end 231 extends in the horizontal direction from the lower side of the first terminal 240, sealing with respect to the first terminal 240 may be more stably performed.

In the case of the first terminal 240, unlike in the first terminal 140 of one or more previously described embodiments, a coupling groove 241b, which is downwardly concavely formed with respect to the approximate center of a terminal portion 241, may be formed. Because a coupling groove 241b is formed to a lower position than the surface of the terminal portion 241, a lower surface 241a of the terminal portion 241, which is configured through the lower surface of the coupling groove 241b, may be set to be lower than one or more previously described embodiments.

Meanwhile, the first terminal 240 may further include a coupling portion 242 and a deformed portion 243. Here, the coupling portion 242 and the deformed portion 243 are shown as cylinders extending with the same diameter. In this case, the first hollow 242a formed inside the coupling portion 242 may be integrally formed with a hollow formed inside the deformed portion 243. However, like one or more previously described embodiments, the diameters of the coupling portion 242 and the deformed portion 243 may be set differently according to the selection by a person skilled in the art.

Next, referring to FIG. 6, a clinching process may be performed on the deformed portion 243 of the first terminal 240. Here, due to the pressure applied to the deformed portion 243, the deformed portion 243 may be deformed to be opened at the lower portion thereof, and at the same time, an end 231 of the insulation plate 230 located outside the deformed portion 243 may also be deformed. Therefore, as described above, the insulation plate 230 further extends in the horizontal direction along the cap plate 120, thereby increasing sealing force.

Next, referring to FIG. 7, in a state in which the collector plate 250 is in contact with the lower portion of the first terminal 240, welding may be performed through welding beams W (e.g., through the first hollow and/or the second hollow). Here, unlike one or more previously described embodiments, the collector plate 250 may not include a separate protrusion, and, as shown, welding may be performed while a flat central region 251 is in contact with the exposed lower surface 241a of the first terminal 240. However, even in this case, because the lower surface 241a of the first terminal 240 is formed relatively deep inside the first terminal 240 due to the coupling groove 241b formed in the center of the first terminal 240, welding may be performed as long as the welding beams W may suitably transmit only through the corresponding thickness to reach the lower surface 241a of the first terminal 240 and the central region 251 of the collector plate 250. Accordingly, the welding quality can be improved, and a likelihood of foreign metal materials being generated in the welding process can be reduced or prevented.

As described above, in the secondary battery and the manufacturing method thereof, according to the present disclosure, in a state in which the first terminal is coupled by being clinched from the inner surface of the cap plate, welding beams are irradiated from the outside of the first terminal to weld the first terminal to the collector plate, wherein the transmission thickness of the welding beams can be reduced by forming a hollow in the first terminal and/or the collector plate, thereby improving welding quality and reducing the generation of foreign materials.

While the foregoing embodiments are only some examples for carrying out the secondary battery and the method for manufacturing the same according to the present disclosure, which is not limited to the disclosed embodiments, it will be understood by a person skilled in the art that various changes in form and details may be made therein without departing from the spirit and scope of the present disclosure as defined by the following claims, with functional equivalents thereof to be included therein.

What is claimed is:

1. A secondary battery comprising:

a case for accommodating an electrode assembly in an internal accommodating space;

a cap plate;

a first terminal inserted into the cap plate in a first direction, defining a first hollow, and bent at an inner surface of the cap plate to be coupled to the cap plate; and a collector plate in the case, electrically connected to a first electrode of the electrode assembly, and coupled to an interior of the first terminal defining the first hollow, wherein the first terminal comprises a terminal portion forming an upper surface thereof, a coupling portion formed under the terminal portion and defining the first hollow therein, and a deformed portion defining a second hollow having a larger diameter than that of the first hollow, wherein the collector plate comprises a protrusion, wherein the protrusion defines a third hollow, wherein a lower surface of the terminal portion is exposed inside the first hollow of the coupling portion, wherein an upper surface of the protrusion is welded to the lower surface of the terminal portion exposed through the first hollow of the coupling portion, and wherein a side surface of the protrusion directly contacts a side surface of the coupling portion.

2. The secondary battery of claim 1, further comprising an insulation plate between the first terminal and the cap plate.

3. The secondary battery of claim 2, wherein an end of the insulation plate is bent with the first terminal.

4. The secondary battery of claim 2, wherein a lower portion of the deformed portion is coupled with a lower surface of the insulation plate.

5. The secondary battery of claim 1, wherein the cap plate is integral with the case, and constitutes one surface of the case.

6. The secondary battery of claim 1, wherein the collector plate further comprises a variable coupling portion, and wherein the variable coupling portion is coupled to the first electrode.

\* \* \* \* \*